Jan. 31, 1967   M. D. GABBERT   3,300,853
FRICTION ELEMENT
Filed Oct. 28, 1963   2 Sheets-Sheet 1
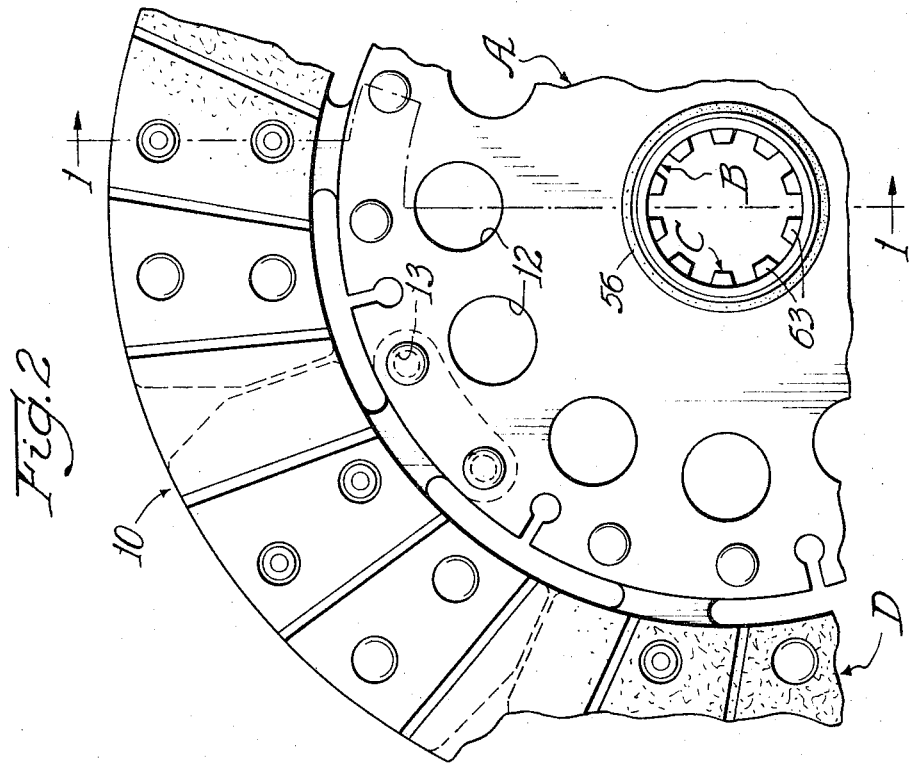
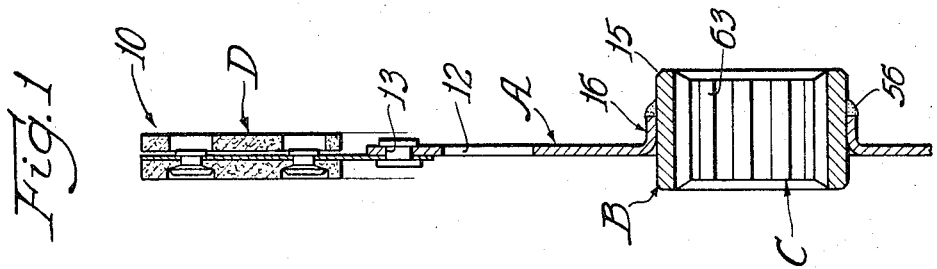
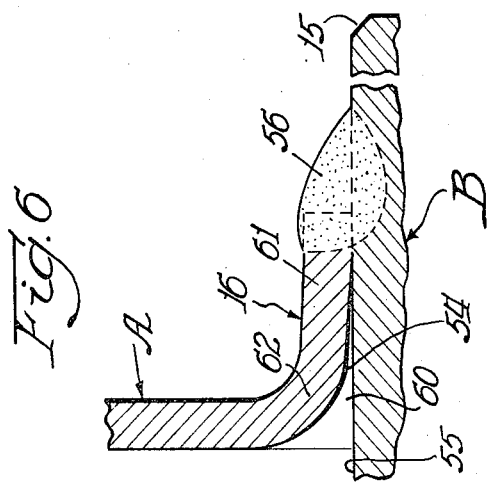
Inventor:
Myron D. Gabbert
By: Joseph W. Malleck
Atty.

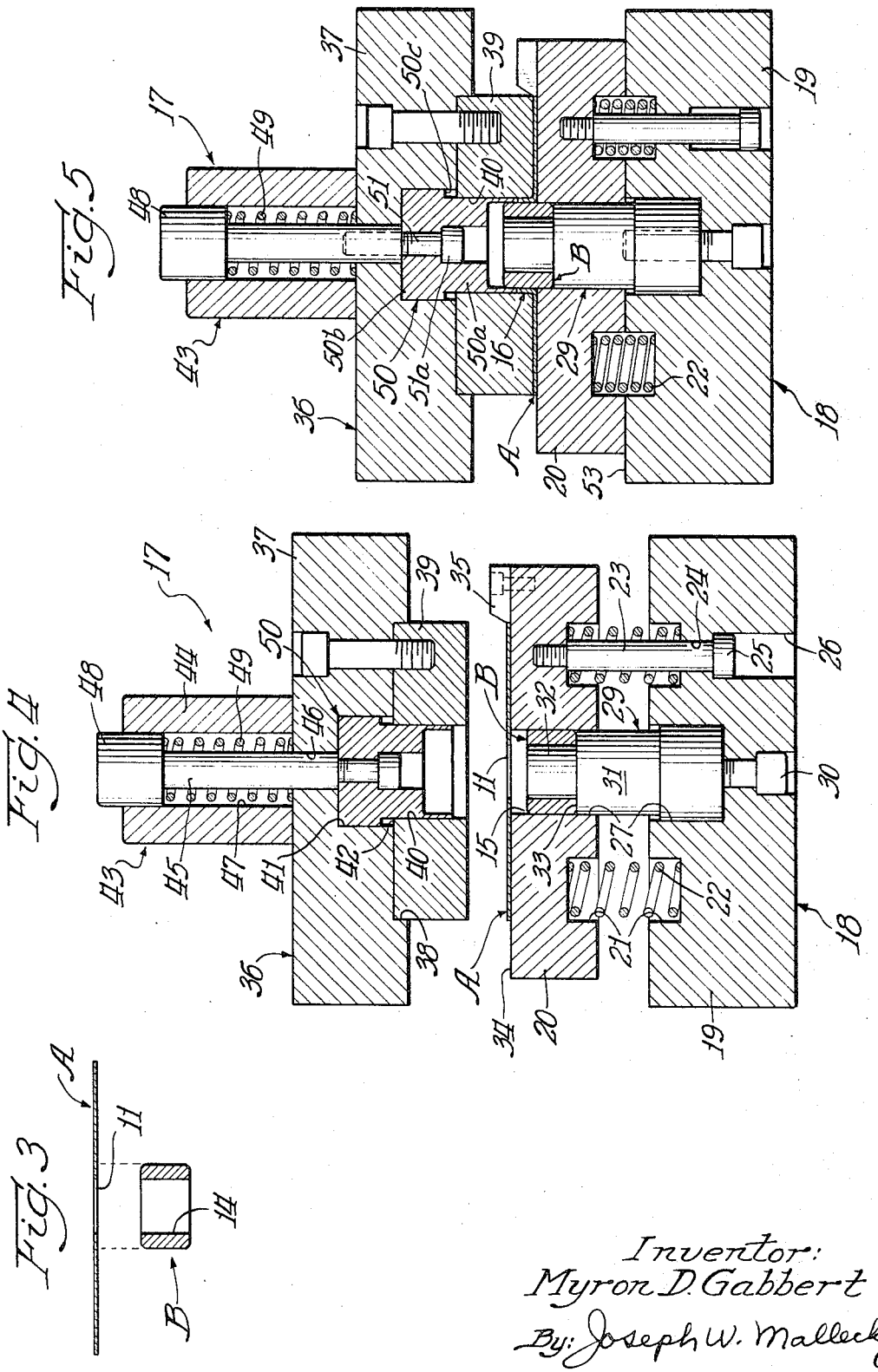

United States Patent Office 3,300,853
Patented Jan. 31, 1967

3,300,853
FRICTION ELEMENT
Myron D. Gabbert, Willow Springs, Ill., assignor to Borg-Warner Corporation, Chicago, Ill., a corporation of Illinois
Filed Oct. 28, 1963, Ser. No. 319,210
4 Claims. (Cl. 29—475)

This invention relates to friction elements and more particularly to the process and resulting product of making a clutch driven plate of the type normally carrying friction facing material at the outer periphery, and having a central hub for transmitting rotative drive.

A primary object of this invention is to provide a new and improved clutch plate of the above type.

Another object of this invention is to provide a clutch plate which is manufactured by an improved process, eliminating separate stamping operations normally used in providing a built-up welded hub construction for clutch plates. A particular feature of this invention pursuant to the above object comprises utilizing a cylindrical hub sleeve as a die or punch to extrude a central flange from the clutch disc, thereby requiring only a welding operation to join the press-fitted pieces into a completed assembly. Such features have resulted in 50% reduction economy of fabrication, while retaining the durability and operating characteristics required of such clutch plates.

Still another object of this invention is to provide a clutch driven plate of the type having a flat annular disc mounted upon a central hub member, the disc being characterized in that it possesses axial flexibility with respect to the hub. A structural feature pursuant to the above object is the provision of a unique welded hub construction whereby a cylindrical sleeve is formed to provide a hub, the sleeve being forced through the central portion of a circular disc to extrude an annular neck portion from the disc which is adapted to have an interference fit about the outer surface of the sleeve, the terminal end portion of the neck being brazed to a sleeve so that flexibility is retained throughout the remaining portion of the neck, affording axial flexibility of the disc on the sleeve.

This invention consists of a novel construction, arrangement and device to be hereinafter described and claimed for carrying out the above-stated objects and such other objects as will be apparent from the following description of a preferred form of this invention, and illustrated with reference to the accompanying drawings:

FIG. 1 is a central sectional view of a friction type clutch plate embodying the principles of this invention;

FIG. 2 is a fragmentary enlarged portion of the hub of FIG. 1;

FIG. 3 is a fragmentary plan view of the construction of FIG. 1;

FIG. 4 is a composite view illustrating the elements of the clutch plate in their disassembled condition, and indicating the manner in which they will be related;

FIG. 5 is a sectional elevational view of a die assembly having the parts of the clutch plates shown in their condition prior to the extrusion operation; and FIG. 6 is a reduced view like that in FIG. 5, illustrating the clutch elements in their fully assembled condition with the discs in their closed position.

Turning now to the drawings and more particularly to FIGS. 1–3, there is shown a preferred embodiment of this invention, comprising a driven disc assembly 10, having a disc A carried on a sleeve B (serving as a hub); the sleeve B is provided with internal splines C to transmit rotative drive and the disc A carries friction facing means D for engagement by suitable means, as known in the disc-type clutch art.

This invention is characterized by the process and method of manufacture of the driven disc assembly and the resulting product therefrom. The method comprises forming and providing the disc A from a suitable sheet of metal so that it has an annular flat configuration (as shown in FIG. 4) and provided with a central opening 11. A plurality of smaller circular openings 12 are formed in circumferential arrangement about the intermediate portion of the disc and other suitable openings 13 are provided for receiving rivets to support the friction facing means D. The entire operation for providing the disc A can be carried out by a single stamping operation which would provide said openings 11, 12 and 13 from a stamped blank of metal.

The next step comprises providing a circular cylindrical sleeve B from steel bar stock which is machined to provide a central bore 14 therein. At least one terminal end portion 15 of the sleeve is provided with a rounded edge, much in the manner of a chamfer so that it may serve as a convenient punch or die in a subsequent step.

The disc A and sleeve B is then assembled together by a single operation, as shown in FIGS. 5 and 6, wherein the sleeve is concentrically aligned with respect to the center of the opening 11 of the disc A and forced in an axial direction against the disc A until the disc is impaled on the outer surface of the sleeve; the inner periphery of the disc is turned outwardly in an annular flange 16 forming a central neck. To accomplish this operation, FIGS. 4 and 5 illustrate one type of die assembly 17 which may be utilized to accomplish the interference fit.

FIG. 4 illustrates the condition wherein the parts are stationed prior to the force-fitting movement. The die assembly comprises a first or lower die portion 18 including a first annular block 19 with a second annular block 20 placed thereover, each of the blocks has a plurality of bores 21 formed therein in coaxially aligned pairs so as to receive coiled springs 22 therein, urging said blocks apart. In the second block 20 there is a plurality of stripper pins 23 threadably received in the bottom of each of the defining walls for opening 21 and extending centrally through the coil springs 22 and into reduced openings 24 formed in the first block. Each of the pins has a head 25 at the lower portion thereof slidably received in a stepped opening 26 at the bottom of the first block. The head 25 of the stripper pin 23 is arranged so that the springs may urge the blocks through a limited distance. A central bore 27 is formed in each of the blocks of the lower die and a pilot member 29 is placed snugly therein and secured to the first block 19 by a cap screw 30 threadably received in the pilot member. The pilot member comprises a circular cylindrical body 31 conforming to the interior diameter of the opening 27 and has a cylindrical nose 32 extending upwardly from the upper surface 33 of the body, the nose being adapted to conform to the interior space of the sleeve. The bottom die 18 is arranged so that when the second block 20 is urged apart from the first block, the sleeve 8, placed on the pilot, will have its terminal end 15 spaced slightly below the upper surface 34 of the second block.

The upper surface 34 of the second block has locators 35 placed at the outer margins thereof to identify proper positioning of a disc blank placed thereon to insure coaxial alignment with the pilot and therefore with the sleeve B disposed on the pilot.

The upper die 36 is independently mounted from the lower die and is adapted to be raised separately; the upper die comprises a first annular block 37 having a circular recess 38 in the bottom thereof adapted to receive a second annular block 39 of reduced diameter than the first. The second block 39 has a central bore 40 formed therein predetermined to be larger than the outer diameter of the sleeve B and calculated to give the proper interference fit between the annular neck 16 and the sleeve B upon operation of the die assembly. A second central bore 41 is formed in the first block 37 having a diameter slightly larger than the central bore 40 of the second block 39, and thereby providing an annular shoulder 42. A knock-out means 43 is provided on the upper die 36 to enable the assembled driven plate to be withdrawn after operation of the dies. The knock-out means comprises a sleeve 44 coaxially journalled on the first block 37 in line with the pilot member 29; the sleeve has a knock-out bar 45 slidably received therein and extends into an opening 46 formed in the first block. The knock-out bar is of smaller diameter than the inner bore 47 of the sleeve, but has a head 48 adapted to slidably bear against the inner surface of bore 49 of the sleeve. The knock-out bar head 48 is resiliently urged by a coiled spring 49 in an upward direction to retract a knock-out block 50 disposed within the aligned bores 40 and 41 respectively of the first and second blocks of the upper die. The knock-out block 50 is attached to the knock-out bar by a cap screw 51 threadably received in the bar and has a head 51a secured against the block. The knock-out block has a central body 50a of sufficient diameter to snugly fit within the bore 40 of the second block and has an enlarged upper cylindrical portion 50b adapted to slidably be received within the bore 41 of the first block; an annular shoulder 50c is formed between said first and second blocks and is arranged to engage the shoulder 42 of the second block to limit downward movement of the knock-out block after the assembled pieces have been knocked out of the die assembly.

As shown in FIG. 5, the blank disc A and the sleeve B are fitted together by first placing the sleeve on the pilot member 29 in the condition of the dies of FIG. 4, and then locating a blank disc between the block and the upper die assembly. Force, by suitable means, is then applied to the upper die 36 pushing it downwardly toward the bottom die 18, whereby the block 39 first engages the disc, then the block 39 and upper block 20 of the bottom die travel together compressing the springs 22 and ultimately bottoming on surface 53 of the bottom block 19, completing the force-fit movement. During such axial movement the inner margin of the disc opening has been forced upwardly to permit intrusion of the sleeve therethrough. The degree of interference fit between the inner surface 54 of the neck and the outer surface 55 of the sleeve can be varied by regulating the internal diameter of the bore 40 of the second block 39 relative to the sleeve's outer diameter. Furthermore, the positioning of the neck 16 on the sleeve can be regulated by the travel of the block relative to the block 19 of the bottom die.

Turning now to FIG. 6, wherein a fragmentary portion of the assembled disc and annular neck of the sleeve B is illustrated. The terminal end 15 of the annular neck is welded to the sleeve to provide a welded bead 56 where profile is shown in FIG. 6. This may be accomplished by an automatic welding machine (not shown) whereby the assembled pieces are picked up automatically and transferred to a spring loaded collet revolving continuously on a spindle, and a welded bead applied according to a predetermined sequence timer; the welded unit is then ejected automatically.

The weld bead profile is critical to this invention in that it must not extend over the terminal end 15 of the annular neck more than one sixteenth of an inch and should extend from the terminal end over an extent of the sleeve approximately three sixteenth of an inch. The control of extension of the weld bead over the terminal end of the sleeve is important to this invention to afford a limited axial flexure; the interference fit is controlled, whereby a slight tapering space 60 is provided between the intermediate portion 61 of the annular neck and the outer surface 55 of the sleeve. Thus, the flared bottom portion 62 of the neck as well as the intermediate portion 61 of the neck is laterally spaced from the sleeve and provides freedom for the disc to flex slightly during operation and withstand vibrations and loading to a better degree than prior art constructions. Since the flared portion 62 and intermediate portion 61 of the neck will move in a direction arcuately toward the center of the sleeve about a pivot point schematically designated at the weld bead, there will be a small amount of axial adjustment.

Force transmitting means C then may be applied to the internal diameter of the sleeve by broaching splines 63 therein (the spline broaching operation may be also performed prior to the interference fit operation). However, it is preferable to the preferred embodiment to apply the splines before such interference fit operation, since the possibility of distorting the splines by heat, used during the welding operation, is eliminated.

The metallic stock utilized for the disc should have a thickness less than the thickness of the sleeve wall, whereby the force required to extrude the disc will not cause the sleeve to collapse during this operation. Furthermore, satisfactory extrusion of the annular neck is provided when the disc opening is at least one third the diameter of the sleeve outer surface. The maximum length of the extruded annular neck should be determined by the thickness of the material and the diameter of the sleeve. The positioning of the neck upon the sleeve is controlled by the die assembly, as explained above.

While I have described my invention in connection with one specific embodiment thereof, it is to be understood that this is by way of illustration and not by way of limitation and the scope of my invention is defined solely by the appended claims, which should be construed as broadly as the prior art will permit.

I claim:
1. A process for fabricating a friction-type clutch plate, comprising: providing a bottom die assembly having a central circular cylindrical pilot member extending outwardly therefrom; providing an upper die assembly having relatively movable portions and having a central opening therethrough coaxial with said pilot member of said bottom die assembly, providing means for moving said upper die assembly relative to said bottom die assembly so that said pilot member may extend into said upper die assembly opening; placing a flat circular disc of metal between the portions of said upper die assembly, said disc having a central opening with margins thereof extending into the upper die assembly opening and being concentric therewith; placing a circular cylindrical metal sleeve on said pilot member forcing said die assemblies together so that said sleeve extrudes the margin of said disc opening to form an annular neck having an interference fit about said sleeve; withdrawing said disc and sleeve assembly from said die and welding the terminal end portion of said extruded neck to said sleeve.

2. A process for fabricating a friction-type clutch plate as in claim 1, in which said bottom die assembly is forced toward said upper die assembly to overcome springs normally urging said die assemblies apart.

3. A process for fabricating a friction-type clutch plate as in claim 1, in which the axial travel of said dies relative to each other is predetermined so that the position of said disc relative to the sleeve is regulated after the extrusion operation.

4. A process for fabricating a friction-type clutch plate as in claim 1, in which the degree of interference fit between said extruded neck of said disc and said sleeve is regulated by varying the diameter of said upper die assembly opening relative to the sleeve diameter.

References Cited by the Examiner

UNITED STATES PATENTS

| | | | |
|---|---|---|---|
| 1,479,974 | 1/1924 | Sturt et al. | 192—107 |
| 1,830,521 | 11/1931 | Reed | 192—107 |
| 2,102,280 | 12/1937 | Pope | 192—107 |
| 2,254,853 | 9/1941 | Mouromtseff et al. | 29—482 |
| 2,448,880 | 9/1948 | Gamble | 192—107 |
| 2,687,142 | 8/1954 | Law | 29—479 |
| 2,721,379 | 10/1955 | Chapman | 29—479 |
| 2,908,368 | 10/1959 | Granke et al. | 192—107 |
| 2,988,811 | 6/1961 | Huet | 29—479 |
| 3,012,317 | 12/1961 | Wolfe | 29—479 |
| 3,175,283 | 3/1965 | Baudras-Chardigny | 29—525 |

JOHN F. CAMPBELL, *Primary Examiner.*

DAVID J. WILLIAMOWSKY, *Examiner.*

B. W. WYCHE, L. J. WESTFALL, *Assistant Examiners.*